(12) United States Patent
Liu et al.

(10) Patent No.: US 11,525,269 B2
(45) Date of Patent: Dec. 13, 2022

(54) METHOD OF MAKING A PLASTIC FLOORING HAVING BACKING STEPS OF

(71) Applicant: Ding Yi Liu, Wuxi (CN)

(72) Inventors: Ding Yi Liu, Wuxi (CN); Zhao Pei Don, Tainan (TW)

(73) Assignee: Ding Yi Liu, Jiangsu Province (CN)

( * ) Notice: Subject to any disclaimer, the term of this patent is extended or adjusted under 35 U.S.C. 154(b) by 0 days.

(21) Appl. No.: 17/541,053

(22) Filed: Dec. 2, 2021

(65) Prior Publication Data

US 2022/0098879 A1 Mar. 31, 2022

Related U.S. Application Data

(63) Continuation-in-part of application No. 16/208,199, filed on Dec. 3, 2018, now abandoned.

(51) Int. Cl.
| | |
|---|---|
| *E04F 15/10* | (2006.01) |
| *B29C 48/07* | (2019.01) |
| *B29C 48/00* | (2019.01) |
| *B29C 59/04* | (2006.01) |
| *B29L 31/00* | (2006.01) |

(52) U.S. Cl.
CPC .......... *E04F 15/10* (2013.01); *B29C 48/0022* (2019.02); *B29C 48/0023* (2019.02); *B29C 48/07* (2019.02); *B29C 59/04* (2013.01); *B29C 2795/007* (2013.01); *B29L 2031/732* (2013.01)

(58) Field of Classification Search
CPC ....... E04F 15/10; E04F 15/105; E04F 15/107; E04F 2290/043; B29C 48/0022; B29C 48/0023; B29C 48/07; B29C 59/04; B29C 2795/007; B29C 48/155; B29C 59/046; B29C 48/0021; B29C 48/02; B29C 48/154; B29C 48/21; B29C 48/92; B29C 37/04; B29C 39/10; B29L 2031/732; B32B 7/12; B32B 27/06; B32B 27/304; B32B 27/40; B32B 37/156; B32B 37/203; B32B 2037/0092; B32B 2250/03; B32B 2250/04; B32B 2255/26; B32B 2307/554; B32B 2471/00

See application file for complete search history.

(56) References Cited

U.S. PATENT DOCUMENTS

2001/0046588 A1 * 11/2001 Sturtevant ............... B60R 13/01
428/141

* cited by examiner

*Primary Examiner* — Cynthia L Schaller

(57) ABSTRACT

A making plastic flooring having a backing contains: a body which has a substrate, a printing layer, and an anti-abrasion layer. A method of making the plastic flooring contains steps of: (A). producing a semi-finished plastic flooring, wherein the semi-finished plastic flooring has the substrate, the printing layer, and the anti-abrasion layer; (B). moving and positioning the semi-finished plastic flooring on a predetermined position of drop plastic equipment, wherein the semi-finished plastic flooring is faced upward; (C). molding the backing, wherein the backing material is melt and is spray onto a bottom of the substrate of the semi-finished plastic flooring by using drop plastic equipment, and the backing material is adhered on the bottom of the substrate of the semi-finished plastic flooring after being solidified; and (D). cutting, wherein the semi-finished plastic flooring having the backing is removed and is cut into a desired size, thus producing the body.

4 Claims, 7 Drawing Sheets

METHOD OF MAKING A PLASTIC FLOORING HAVING BACKING STEPS OF

BACKGROUND OF THE INVENTION

This application is a Continuation-in-Part of application Ser. No. 16/208,199, filed Dec. 3, 2018.

FIELD OF THE INVENTION

The present invention relates to a method of making the plastic flooring having backing in a spraying manner or a coating manner.

BACKGROUND OF THE INVENTION

Referring to FIG. 7, equipment of making a substrate of plastic flooring is disclosed in US Publication No. 20190070844. A press roller 50 is configured to roll and press a substrate 11, a printing layer 12, and an anti-abrasion layer 13 on a backing 14, wherein the substrate 11 is extrusion molded by using an extruder 20 and is transported to a pressing machine 50. The printing layer 12 is delivered to the pressing machine 50 by ways of a first rolling machine 41, and the anti-abrasion layer 13 is conveyed to the pressing machine 50 by mean of a second rolling machine 42, and the backing 14 is delivered to the pressing machine 50 by using a third rolling machine 43. The backing is formed on the bottom of the substrate in a sheet shape, and when a user walks on the backing noises will make loudly.

Furthermore, as shown in FIG. 8, a thermoplastic laminate plank is disclosed in US Publication No. 2002/0142135. The backing of the flooring contains multiple plastic straps 62 (made of rubber or flexible material) are engaged in multiple receiving grooves of the substrate, thus causing troublesome manufacture.

The present invention has arisen to mitigate and/or obviate the afore-described disadvantages.

SUMMARY OF THE INVENTION

The primary aspect of the present invention is to provide a method of making plastic flooring having backing which avoids coating glue on the backing and noises making when walking on the plastic flooring.

Another aspect of the present invention is to provide a method of making plastic flooring having backing by which the backing of the body is produced in a spraying manner, and the multiple plastic materials are formed on the bottom of the substrate in the multiple spaced strap shapes or the multiple spaced spot shapes, and the distribution shapes, the positions, and the sizes of the multiple plastic materials are set by ways of the electric control system to avoid the noises making when walking on the plastic flooring and to obtain environmental protection and automated production efficiency.

To obtain above-mentioned aspects, a method of making a plastic flooring having backing provided by the present invention contains steps of:

(A). producing a semi-finished plastic flooring, wherein the substrate is extrusion molded by using an extruder and is transported to a pressing machine, a printing layer is delivered to the pressing machine by ways of a first rolling machine, and an anti-abrasion layer is conveyed to the pressing machine by mean of a second rolling machine, wherein substrate, the printing layer, and the anti-abrasion layer are pressed together by using the pressing machine, thus producing the semi-finished plastic flooring;

wherein the pressing machine includes a pedestal on which a thick rolling set, a contact rolling set, and a press rolling set are arranged;

wherein the substrate has a top and a bottom, and the substrate is delivered through and is pressed by the contacting roller, the printing layer is adhered on the top of the substrate after being guided to the contacting roller by one of multiple guiding rollers, and the anti-abrasion layer is guided to the contacting roller by one of the multiple guiding rollers and is adhered on the printing layer, thereafter the press rolling set rolls and presses the substrate, the printing layer, and the anti-abrasion layer together, thus forming the semi-finished plastic flooring;

(B). moving and positioning the semi-finished plastic flooring, wherein the semi-finished plastic flooring is put on a predetermined position of a drop plastic equipment, and the drop plastic equipment includes a base on which a delivery belt is secured, wherein the delivery belt is configured to deliver and hold the semi-finished plastic flooring on a predetermined placing position, and the bottom of the substrate of the semi-finished plastic flooring faces upward;

(C). molding the backing, wherein multiple plastic raw pellets are melt to form melted plastic materials and are separately sprayed onto the bottom of the substrate of the semi-finished plastic flooring by using the spraying mechanism of the drop plastic equipment so that the melted plastic materials are separately arrange around a peripheral side of the bottom of the substrate, wherein distribution shapes, positions, and sizes of the melted plastic materials are set by ways of an electric control system in advance, and the melted plastic materials form solidified plastic materials separately after solidifying and are separately adhered on the bottom of the substrate of the semi-finished plastic flooring; and (D). cutting, wherein the semi-finished plastic flooring having the backing is removed and is cut into a desired size, thus producing the body.

DETAILED DESCRIPTION OF THE PREFERRED EMBODIMENTS

Figure 1:
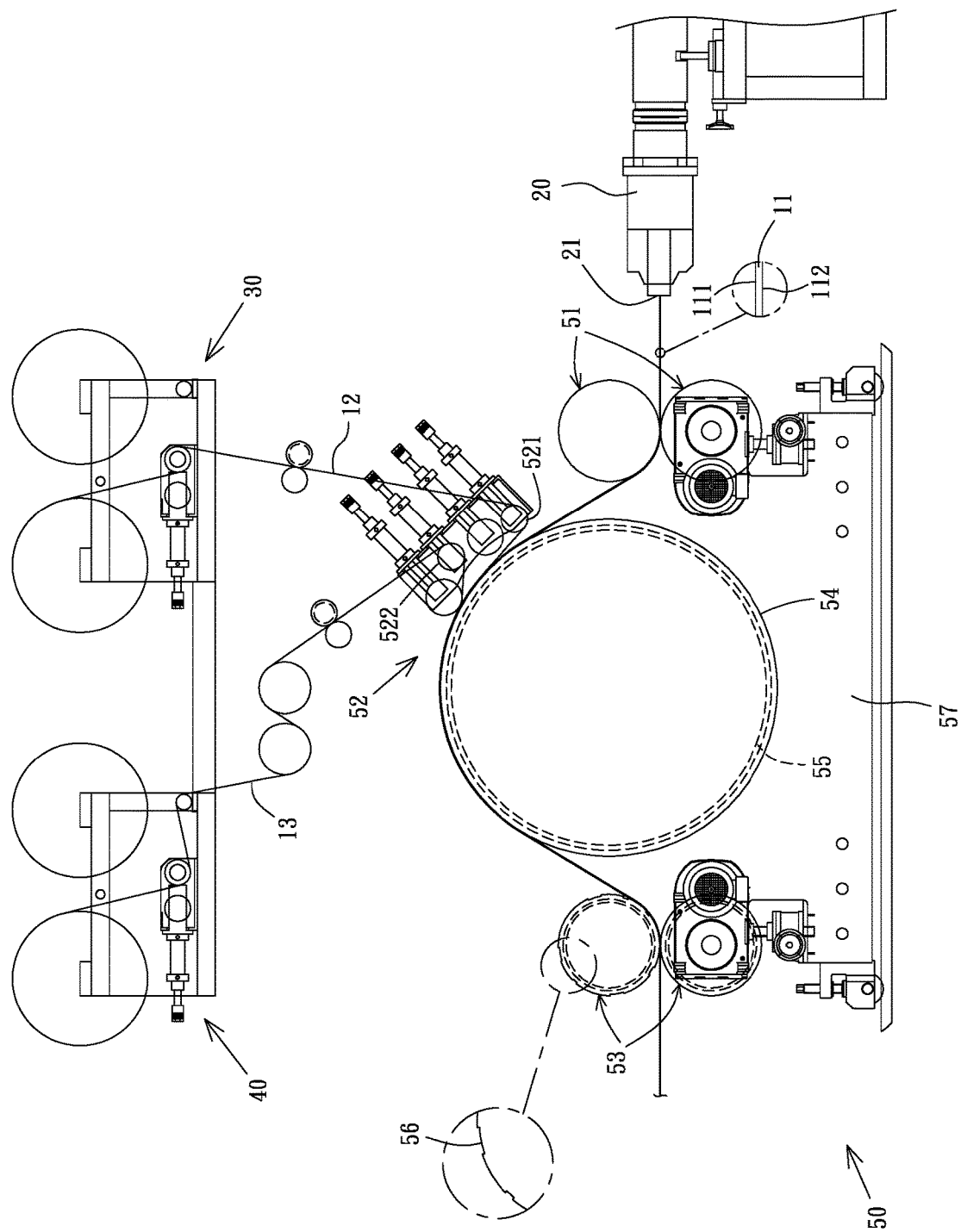
FIG. 1 is a schematic view showing equipment of making plastic flooring having backing according to a preferred embodiment of the present invention.
Figure 2:
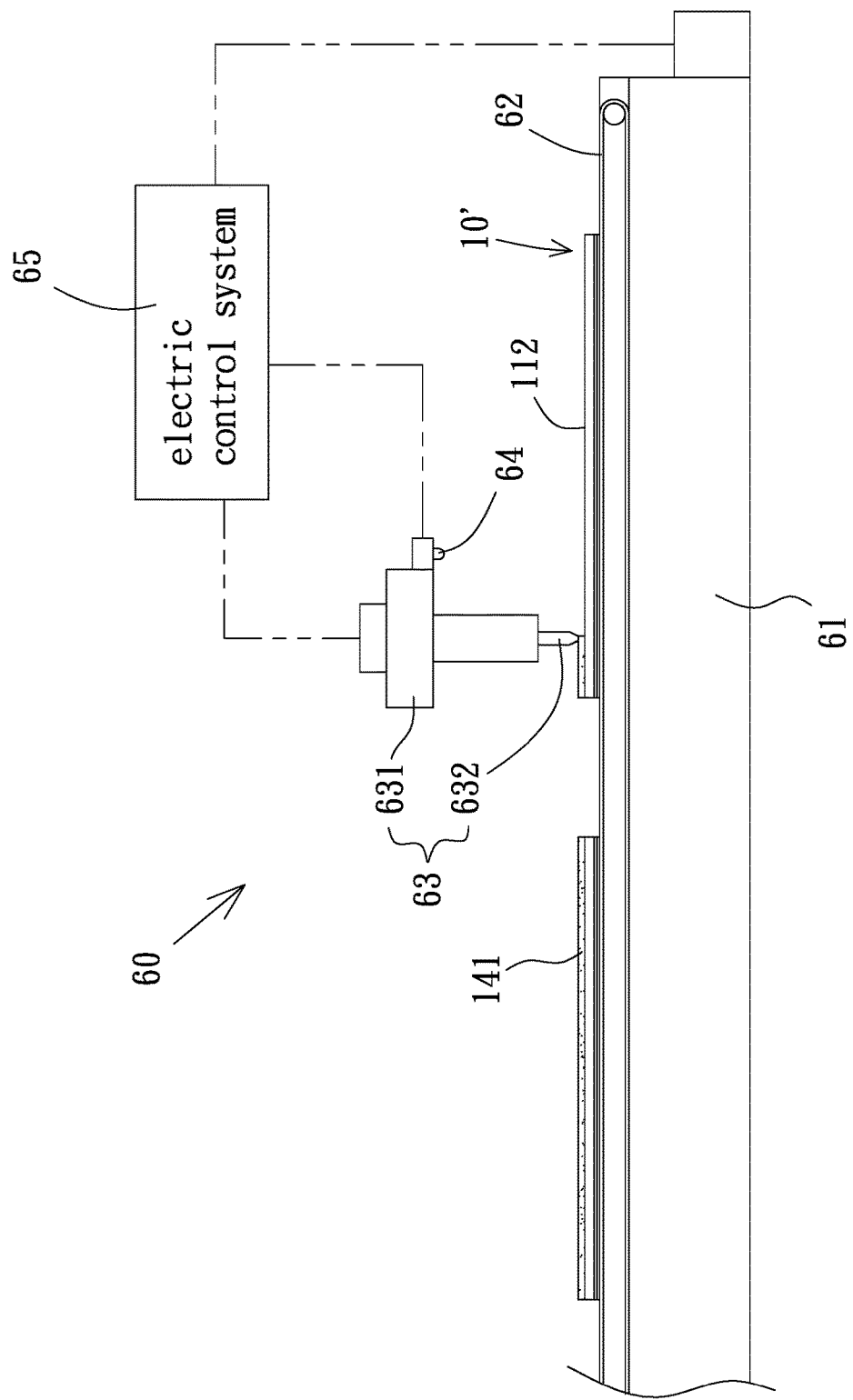
FIG. 2 is a schematic view showing a part of the equipment of making the plastic flooring having the backing according to the preferred embodiment of the present invention.

Referring further to FIGS. 1-6, a method of making a plastic flooring having backing according to a preferred embodiment of the present invention, the plastic flooring comprises a body 10 including:
- a substrate 11 having a top 111 and a bottom 112;
- a printing layer 12 having patterns and adhered on the top 111 of the substrate 11 after being rolled with the substrate 11;
- an anti-abrasion layer 13 adhered on the printing layer 12 after being rolled with the printing layer 12; and
- a backing 14 made of polyvinyl chloride (PVC) or polyurethane (PU) which are melt and separately arranged around a peripheral side of the bottom 112 of the substrate 11 in multiple spaced strap shapes or multiple spaced spot shapes after solidifying, and the backing is formed after solidifying PVC or PU. The method of making the plastic flooring comprises steps of:
  (A), producing a semi-finished plastic flooring 10', wherein the substrate 11 is extrusion molded by using an extruder 20 and is transported to a pressing machine 50, the printing layer 12 is delivered to the pressing machine 50 by ways of a first rolling machine 30, and the anti-abrasion layer 13 is conveyed to the pressing machine 50 by mean of the second rolling machine 40, wherein the substrate 11, the printing layer 12, and the anti-abrasion layer 13 are pressed together by using the pressing machine 50, thus producing the semi-finished plastic flooring 10'.

The pressing machine 50 is a five-roller pressing machine, and the pressing machine 50 includes a pedestal 57 on which a thick rolling set 51, a contact rolling set 52, and a press rolling set 53 are arranged.

The thickness rolling set 51 has two rollers fixed beside a first side of the contact rolling set 52, and a contacting position of the two thickness rollers linearly aligns with an outlet 21 of the extruder 20.

The contact rolling set 52 has a contacting roller 54, multiple guiding rollers 521, 522 arranged around the contacting roller 54, wherein a diameter of the contacting roller 54 is more than the thickness rolling set 51 and the contact rolling set 52, a heating unit 55 accommodated in the contacting roller 54, wherein the heating unit 55 has multiple pipes connected with an external device (not shown) so that hot oil flows to the heating unit 55 from the external device via the multiple pipes, by which the substrate 11, the printing layer 12, and the anti-abrasion layer 13 are heated.

The substrate 11 is delivered through and is pressed by the contacting roller 54 so as to limit a thickness of the substrate 11, the printing layer 12 is adhered on the top 111 of the substrate 11 after being guided to the contacting roller 54 by one of the multiple guiding rollers 521, and the anti-abrasion layer 13 is guided to the contacting roller 54 by one of the multiple guiding rollers 522 and is adhered on the printing layer 12.

The press rolling set 53 is mounted beside a second side of the contact rolling set 52, and the press rolling set 53 has two opposite pressing rollers configured to roll and press the substrate 11, the printing layer 12, and the anti-abrasion layer 13 together, wherein one of the two opposite pressing rollers is made of metal and has embossing section 56 formed thereon so that the anti-abrasion layer 13 has three-dimensional pressing patterns after pressing the substrate 11, the printing layer 12, and the anti-abrasion layer 13.

The method of making the plastic flooring further comprises a step of:
  (B). moving and positioning the semi-finished plastic flooring 10', wherein the semi-finished plastic flooring 10' is cut into multiple sheets in a predetermined size and is put on a predetermined position of a drop plastic equipment 60, and the bottom 112 of the substrate 11 of the semi-finished plastic flooring 10' faces upward.

The drop plastic equipment 60 includes a base 61 on which a delivery belt 62 is secured, wherein the delivery belt 62 is configured to deliver and hold the semi-finished plastic flooring 10' on a predetermined placing position. The drop plastic equipment 60 further includes a spraying mechanism 63 and at least one sensing unit 64 which are located above the base 61 and opposite to the delivery belt 62, wherein the spraying mechanism 63 has a material collector 631 and at least one material feeder 632 mounted on a bottom of the material collector 631, wherein the material collector 631 accommodates melted plastic materials fed by an external supply device, and the material feeder 632 discharges and feeds the melted plastic materials, wherein the melted plastic materials are melt in a high temperature and are made of multiple plastic raw pellets, such as polyvinyl chloride (PVC) or polyurethane (PU).

The spraying mechanism 63 is movable or is fixed. When the spraying mechanism 63 is movable, it has one material feeder 632 which is controlled by an electric control system 65 to move. When the spraying mechanism 63 is fixed, it has multiple material feeders 632 which are fixed at a predetermined position. For example, in this embodiment, the spraying mechanism 63 is fixed. The sensing unit 64 is an infrared radiation (IR) sensor and is disposed on a side of the material collector 631. When the semi-finished plastic flooring 10' is delivered to pass through and located below the sensing unit 64, the sensing unit 64 transmits a signal to the electric control system 65 so that the electric control system 65 controls the spraying mechanism 63 to spray the melted plastic materials onto the semi-finished plastic flooring 10'.

Figure 3:
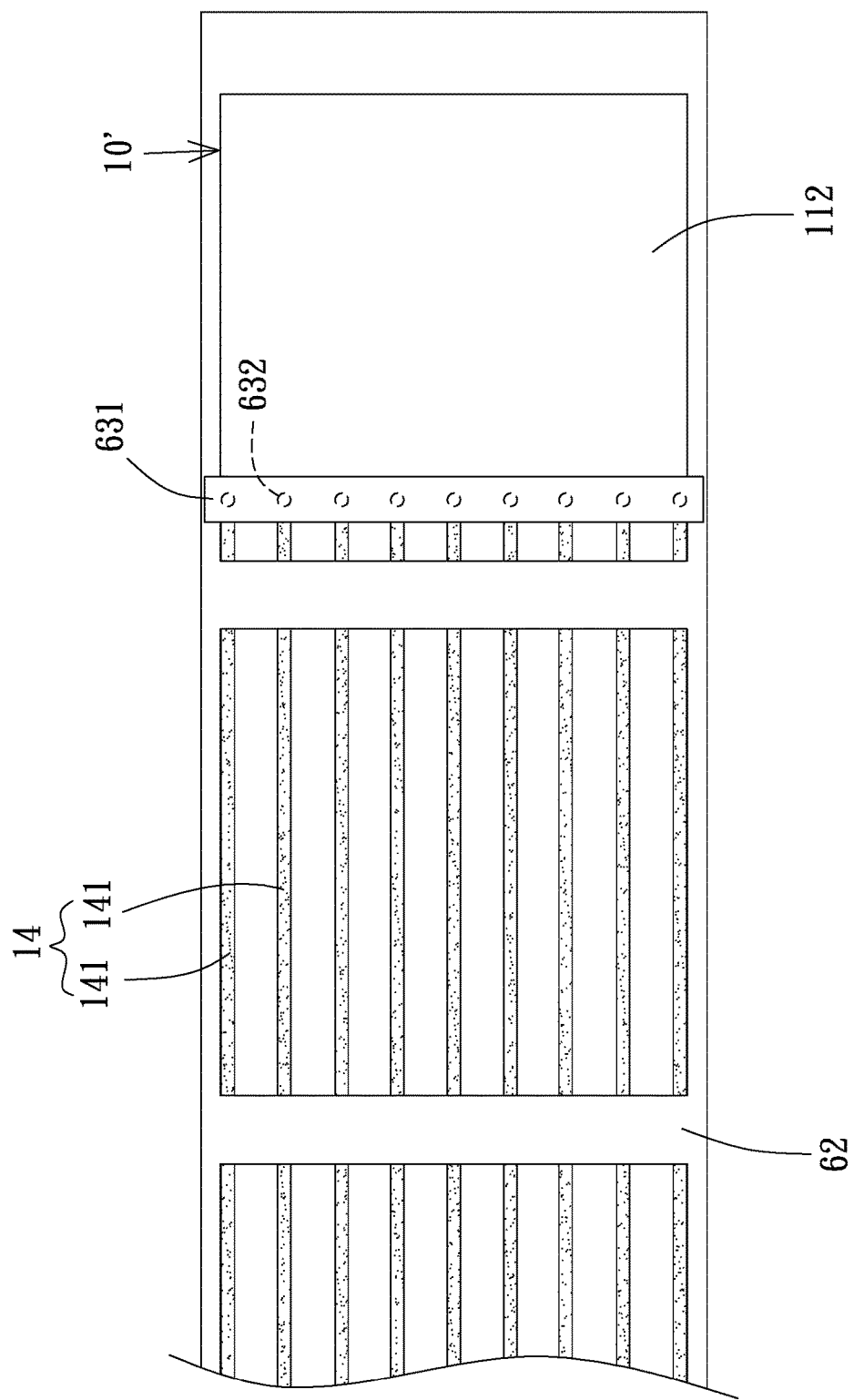
FIG. 3 is a schematic view showing drop plastic equipment making the solidified plastic materials according to the preferred embodiment of the present invention.
Figure 4:
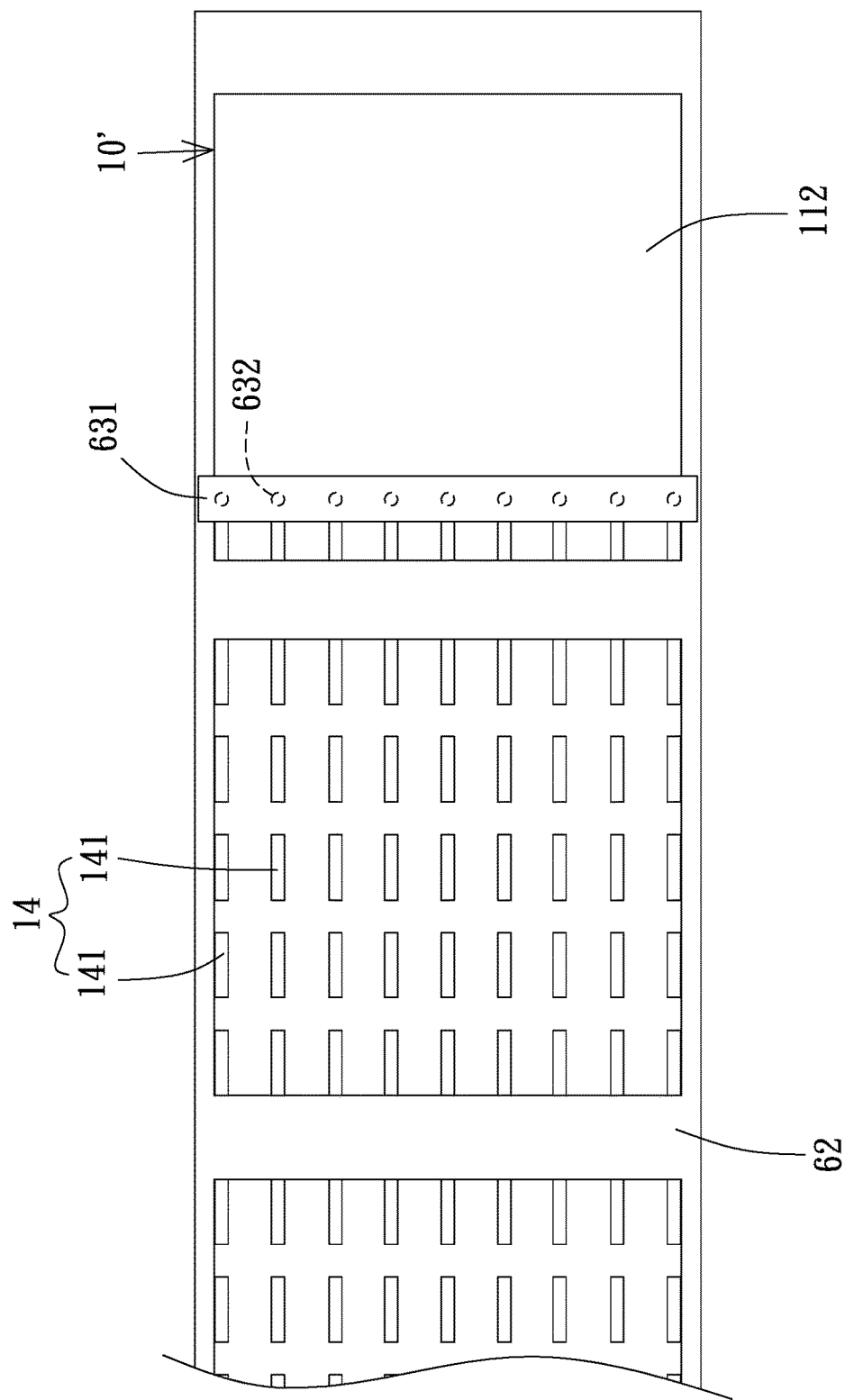
FIG. 4 is a schematic view showing drop plastic equipment making the solidified plastic materials according to another preferred embodiment of the present invention.
Figure 5:
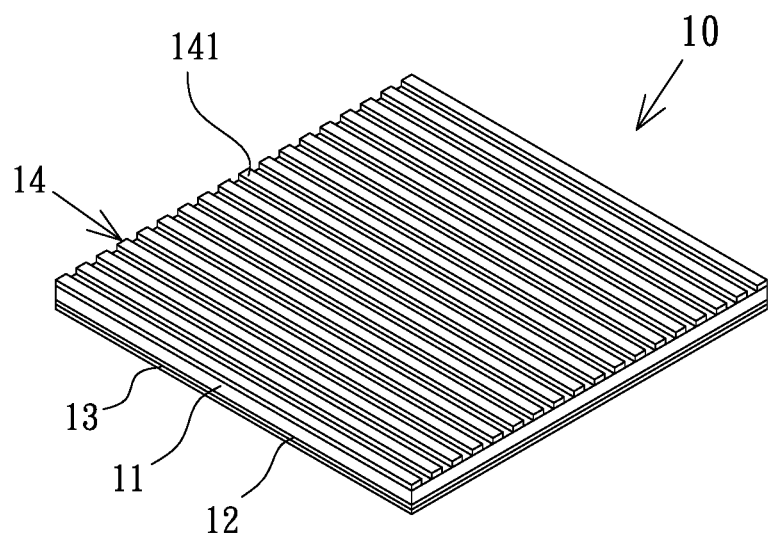
FIG. 5 is another schematic view showing the assembly of the body of the plastic flooring having the backing according to the preferred embodiment of the present invention.
Figure 6:
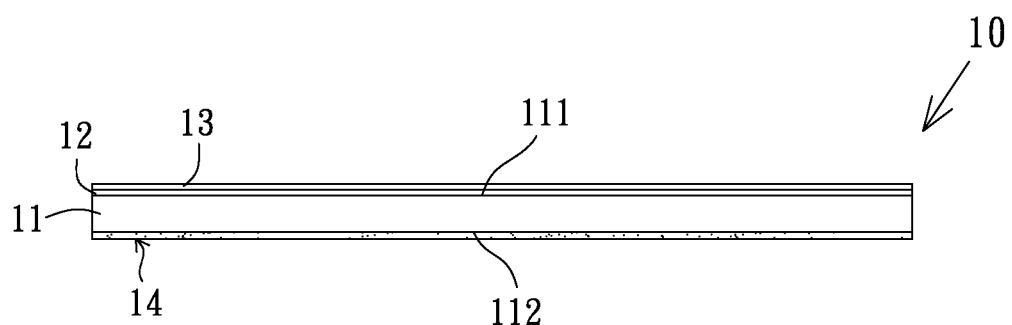
FIG. 6 is a cross sectional view showing the assembly of the body of the plastic flooring having the backing according to the preferred embodiment of the present invention.
Figure 7:
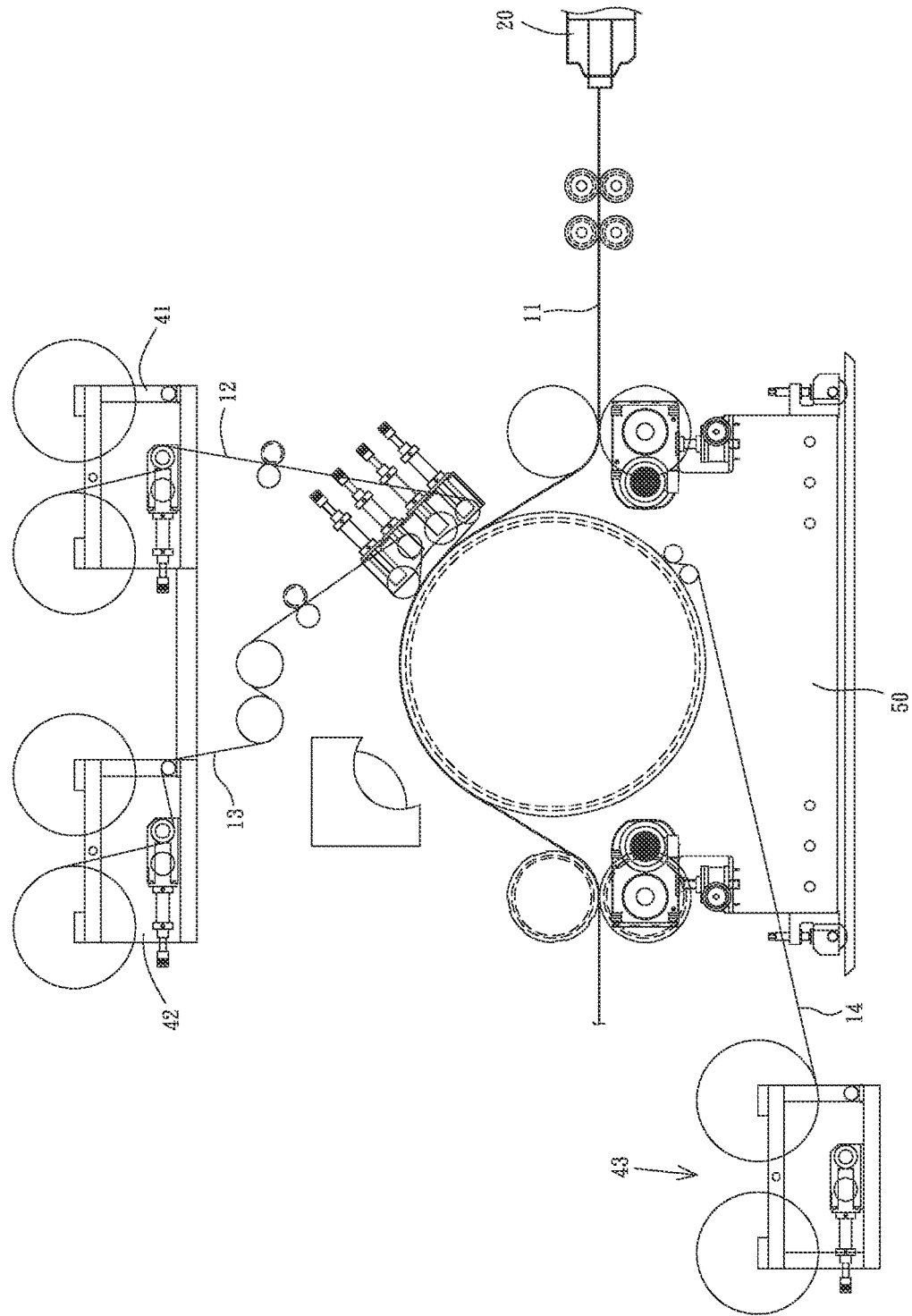
FIG. 7 is a schematic view of a conventional equipment of making a substrate of plastic flooring.
Figure 8:
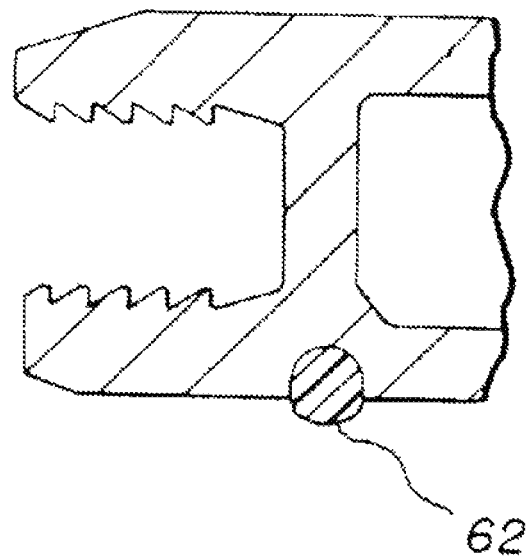
FIG. 8 is a schematic view of a conventional thermoplastic laminate plank.

The method of making the plastic flooring further comprises a step of:
  (C). molding the backing 14, wherein the multiple plastic raw pellets (made of PVC or PU) are melt to form the melted plastic materials, and the melted plastic materials are separately sprayed onto the bottom 112 of the substrate 11 of the semi-finished plastic flooring 10' in the multiple spaced spot shapes by using the spraying mechanism 63 of the drop plastic equipment 60, wherein the melted plastic materials are separately sprayed and distribution shapes, positions, and sizes of the melted plastic materials are set by ways of an electric control system 65 in advance so that the melted plastic materials form solidified plastic materials separately after solidifying and are separately adhered around the peripheral side of the bottom 11 of the substrate 11 of the semi-finished plastic flooring 10', thus forming the backing 14. As shown in FIGS. 3 and 4, the solidified plastic materials 141 are sprayed around the peripheral side of the bottom 112 of the substrate 11 in the multiple spaced strap shapes or multiple spaced dotted spot shapes.

The method of making the plastic flooring further comprises a step of:
  (D). cutting, wherein the semi-finished plastic flooring 10' having the backing 14 is removed and is cut into a desired size, thus producing the body 10.

Thereby, the backing 14 of the body 10 is produced in a spraying manner, the solidified plastic materials 141 are formed on the bottom 112 of the substrate 11 in the multiple spaced strap shapes or the multiple spaced spot shapes, and the distribution shapes, the positions, and the sizes of the melted plastic materials are set by ways of the electric control system 65 before solidifying to avoid the noises when producing the backing and to obtain environmental protection and automated production efficiency.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A method of making a plastic flooring having backing steps of:
   (A) producing a semi-finished plastic flooring, wherein a substrate is extrusion molded by using an extruder and is transported to a pressing machine, a printing layer is delivered to the pressing machine by a first rolling machine, and an anti-abrasion layer is conveyed to the pressing machine by mean of a second rolling machine, wherein the substrate, the printing layer, and the anti-abrasion layer are pressed together by using the pressing machine, thus producing the semi-finished plastic flooring;
   wherein the pressing machine includes a pedestal on which a thick rolling set, a contact rolling set, and a press rolling set are arranged;
   wherein the substrate has a top and a bottom, and the substrate is delivered through and is pressed by a contacting roller, the printing layer is adhered on the top of the substrate after being guided to the contacting roller by one of multiple guiding rollers, and the anti-abrasion layer is guided to the contacting roller by one of the multiple guiding rollers and is adhered on the printing layer, thereafter the press rolling set rolls and presses the substrate, the printing layer, and the anti-abrasion layer together;
   (B) moving and positioning the semi-finished plastic flooring, wherein the semi-finished plastic flooring is put on a predetermined position of a drop plastic equipment, and the drop plastic equipment includes a base on which a delivery belt is secured, wherein the delivery belt is configured to deliver and hold the semi-finished plastic flooring on the predetermined position of the drop plastic equipment, and the bottom of the substrate of the semi-finished plastic flooring faces upward;
   (C) molding a backing, wherein multiple plastic raw pellets are melt to form melted plastic materials and are separately sprayed onto the bottom of the substrate of the semi-finished plastic flooring by using a spraying mechanism of the drop plastic equipment so that the melted plastic materials are separately arrange near a periphery of the bottom surface of the substrate, wherein distribution shapes, positions, and sizes of the melted plastic materials are set by an electric control system in advance, and individual or separate spaced plastic shapes deposited by spraying melted plastic remain spaced or separate upon solidification on the bottom of the substrate of the semi-finished plastic flooring, thus forming the backing; and
   (D) cutting, wherein the semi-finished plastic flooring having the backing is removed from the drop plastic equipment and is cut into a desired size, thus producing a body.

2. The method as claimed in claim 1, wherein multiple plastic materials are formed on the bottom of the substrate in multiple spaced strap shapes or multiple spaced spot shapes.

3. The method as claimed in claim 1, wherein the pressing machine is a five-roller pressing machine, and the thick rolling set has two rollers fixed beside a first side of the contact rolling set, and a contacting position of the two thickness rollers linearly aligns with an outlet of the extruder so as to limit a thickness of the substrate;
   wherein the contact rolling set has the contacting roller, multiple guiding rollers arranged around the contacting roller, and a diameter of the contacting roller is more than a diameter of the thick rolling set;
   wherein the press rolling set is mounted beside a second side of the contact rolling set, and the press rolling set has two opposite pressing rollers configured to roll and press the substrate, the printing layer, and the anti-abrasion layer together, wherein one of the two opposite pressing rollers is made of metal and has an embossing section formed thereon so that the anti-abrasion layer has three-dimensional pressing patterns after pressing the substrate, the printing layer, and the anti-abrasion layer.

4. The method as claimed in claim 1, wherein the plastic raw pellets are made of polyvinyl chloride (PVC) or polyurethane (PU).

* * * * *